US011150622B2

(12) United States Patent
Lee et al.

(10) Patent No.: US 11,150,622 B2
(45) Date of Patent: Oct. 19, 2021

(54) QUALITY CONTROL ISOMETRIC FOR INSPECTION OF FIELD WELDS AND FLANGE BOLT-UP CONNECTIONS

(71) Applicant: Bentley Systems, Incorporated, Exton, PA (US)

(72) Inventors: Graham Lee, Manchester (GB); Gary Orton, Vancouver (CA); Jonathan Cunningham, Calgary (CA); Ryan Posnikoff, Vancouver (CA); Dean Bowman, Fernandina Beach, FL (US)

(73) Assignee: Bentley Systems, Incorporated, Exton, PA (US)

( * ) Notice: Subject to any disclaimer, the term of this patent is extended or adjusted under 35 U.S.C. 154(b) by 231 days.

(21) Appl. No.: 16/193,927

(22) Filed: Nov. 16, 2018

(65) Prior Publication Data
US 2019/0146448 A1 May 16, 2019

Related U.S. Application Data

(60) Provisional application No. 62/587,449, filed on Nov. 16, 2017.

(51) Int. Cl.
*G05B 19/04* (2006.01)
*G05B 19/40* (2006.01)
(Continued)

(52) U.S. Cl.
CPC ....... *G05B 19/0428* (2013.01); *G05B 19/406* (2013.01); *G05B 2219/32368* (2013.01); *G05B 2219/45135* (2013.01)

(58) Field of Classification Search
None
See application file for complete search history.

(56) References Cited

U.S. PATENT DOCUMENTS 5,740,341 A * 4/1998 Oota ................. G06F 30/18
345/420
6,157,864 A * 12/2000 Schwenke ............. G06T 11/206
700/79
(Continued)

FOREIGN PATENT DOCUMENTS

CN    104599024 A  *  5/2015   ............ G06Q 10/06
CN    105679148 A  *  6/2016   ............ G09B 19/24
(Continued)

OTHER PUBLICATIONS

Bentley Systems, "OpenPlant Isometrics Manager—Common Customizations", version 2.0, pp. 1-57. Aug. 4, 2014.
(Continued)

*Primary Examiner* — Mohammad Ali
*Assistant Examiner* — Kelvin Booker
(74) *Attorney, Agent, or Firm* — Cesari and McKenna, LLP; James A. Blanchette (57) ABSTRACT

In one embodiment, a modeling process adds unique numbers for field welds or flange bolt-up connections to a virtual construction model of an infrastructure construction project. Based on the virtual construction model and a fabrication data file that describes a portion of the infrastructure construction project, a QC drawing generation process generates a QC drawing for the portion of the infrastructure construction project that includes balloons linked to locations of field welds or flange bolt-up connections, each balloon including the unique number of a corresponding field weld or flange bolt-up connection. A copy of the QC drawing is provided to a field inspection worker. Subsequently, a marked-up copy of the QC drawing is received back that includes field inspection results associated with the unique number of each field weld or flange bolt-up connec-
(Continued)

tion. The marked-up copy may be maintained in a document control system.

19 Claims, 5 Drawing Sheets

(51) Int. Cl.
*G05B 19/042* (2006.01)
*G05B 19/406* (2006.01)

(56) References Cited

U.S. PATENT DOCUMENTS

| | | | | |
|---|---|---|---|---|
| 6,167,406 A * | 12/2000 | Hoskins | G06F 16/21 | 705/1.1 |
| 6,243,483 B1 * | 6/2001 | Petrou | F17D 5/00 | 348/144 |
| 6,268,853 B1 * | 7/2001 | Hoskins | G05B 15/02 | 700/83 |
| 6,556,950 B1 * | 4/2003 | Schwenke | G05B 17/02 | 700/83 |
| 7,417,726 B2 * | 8/2008 | Kao | B01L 3/50851 | 356/243.1 |
| 8,831,205 B1 * | 9/2014 | Wu | H04M 3/5233 | 379/265.11 |
| 9,196,169 B2 * | 11/2015 | Wallace | G09B 19/24 | |
| 9,468,988 B2 * | 10/2016 | Daniel | B23K 31/12 | |
| 9,589,481 B2 * | 3/2017 | Becker | G05B 19/128 | |
| 9,724,787 B2 * | 8/2017 | Becker | B23K 9/0956 | |
| 9,759,691 B2 * | 9/2017 | Boulware | G01N 29/262 | |
| 9,836,994 B2 * | 12/2017 | Kindig | G09B 19/24 | |
| 9,862,049 B2 * | 1/2018 | Becker | G05B 9/02 | |
| 9,937,577 B2 * | 4/2018 | Daniel | B23K 9/1043 | |
| 9,937,578 B2 * | 4/2018 | Becker | B23K 9/0956 | |
| 9,948,354 B2 * | 4/2018 | Bennett | H04B 3/54 | |
| 10,090,594 B2 * | 10/2018 | Henry | H01Q 13/06 | |
| 10,105,782 B2 * | 10/2018 | Becker | B23K 9/1062 | |
| 10,307,853 B2 * | 6/2019 | Becker | G09B 9/00 | |
| 10,402,959 B2 * | 9/2019 | Becker | G06T 7/0004 | |
| 10,417,934 B2 * | 9/2019 | Becker | B23K 9/322 | |
| 10,427,239 B2 * | 10/2019 | Becker | B23K 9/0953 | |
| 10,438,505 B2 * | 10/2019 | Becker | B23K 9/32 | |
| 10,496,080 B2 * | 12/2019 | Daniel | B23K 9/0953 | |
| RE47,918 E * | 3/2020 | Wallace | B23K 9/0953 | |
| 10,593,230 B2 * | 3/2020 | Becker | G09B 9/00 | |
| 10,657,839 B2 * | 5/2020 | Becker | B23K 9/0956 | |
| 10,665,128 B2 * | 5/2020 | Becker | B23K 9/32 | |
| 10,682,720 B2 * | 6/2020 | Becker | B23K 9/0953 | |
| 10,732,621 B2 * | 8/2020 | Celia | H04B 17/309 | |
| 2004/0030741 A1 | 2/2004 | Wolton | G06F 16/954 | 709/202 |
| 2004/0073404 A1 * | 4/2004 | Brooks | G05B 23/0216 | 702/183 |
| 2004/0134970 A1 * | 7/2004 | Den Boer | B23K 31/12 | 228/104 |
| 2005/0103767 A1 * | 5/2005 | Kainec | B23K 11/252 | 219/130.5 |
| 2006/0059011 A1 * | 3/2006 | Ulreich | G06Q 30/00 | 705/400 |
| 2007/0078893 A1 * | 4/2007 | Milhet | G06Q 10/06 | |
| 2007/0158390 A1 * | 7/2007 | Anderson | B23K 20/023 | 228/101 |
| 2008/0120070 A1 * | 5/2008 | Miller | G06F 30/17 | 703/1 |
| 2008/0232677 A1 * | 9/2008 | Schwarz | B23K 26/044 | 382/152 |
| 2009/0100900 A1 * | 4/2009 | Spalding | G01B 11/08 | 73/1.81 |
| 2009/0101851 A1 * | 4/2009 | Spalding | G01B 11/2433 | 250/559.12 |
| 2009/0102107 A1 * | 4/2009 | Kolodge | G01B 11/2425 | 269/13 |
| 2009/0103107 A1 * | 4/2009 | Nygaard | G01B 11/2433 | 356/602 |
| 2009/0103109 A1 * | 4/2009 | Spalding | H01S 3/005 | 356/625 |
| 2009/0103111 A1 * | 4/2009 | Spalding | G01B 11/245 | 356/638 |
| 2010/0019084 A1 * | 1/2010 | Sisk | G06Q 10/087 | 244/1 R |
| 2010/0030526 A1 | 2/2010 | Brooks et al. | | |
| 2010/0217440 A1 * | 8/2010 | Lindell | G05B 19/41875 | 700/275 |
| 2014/0014638 A1 * | 1/2014 | Artelsmair | B23K 9/0953 | 219/130.01 |
| 2014/0047064 A1 * | 2/2014 | Maturana | H04L 67/125 | 709/217 |
| 2014/0047107 A1 * | 2/2014 | Maturana | G05B 19/056 | 709/224 |
| 2014/0078499 A1 * | 3/2014 | Tunheim | G01N 21/31 | 356/241.1 |
| 2014/0080223 A1 * | 3/2014 | Tunheim | G01N 21/954 | 436/164 |
| 2014/0080224 A1 * | 3/2014 | Tunheim | G01M 3/38 | 436/164 |
| 2014/0081594 A1 * | 3/2014 | Tunheim | G01N 21/954 | 702/150 |
| 2014/0335480 A1 * | 11/2014 | Asenjo | G06Q 10/06 | 434/107 |
| 2014/0336785 A1 * | 11/2014 | Asenjo | G06F 3/048 | 700/17 |
| 2014/0336786 A1 * | 11/2014 | Asenjo | G06F 3/048 | 700/17 |
| 2014/0337000 A1 * | 11/2014 | Asenjo | G06F 30/20 | 703/13 |
| 2015/0186472 A1 * | 7/2015 | Stanic | G06F 40/186 | 707/722 |
| 2015/0281453 A1 * | 10/2015 | Maturana | G05B 23/0213 | 379/265.12 |
| 2015/0290735 A1 * | 10/2015 | Beattie | B23K 9/0956 | 700/166 |
| 2015/0308981 A1 * | 10/2015 | Fisher | G01N 29/04 | 73/168 |
| 2016/0071059 A1 * | 3/2016 | Petering | G06Q 10/103 | 705/301 |
| 2016/0182309 A1 * | 6/2016 | Maturana | G06F 30/20 | 709/224 |
| 2016/0231291 A1 * | 8/2016 | Boulware | G01N 29/0645 | |
| 2016/0274552 A1 * | 9/2016 | Strohmenger | G06Q 10/06 | |
| 2016/0274553 A1 * | 9/2016 | Strohmenger | G05B 17/02 | |
| 2016/0274558 A1 * | 9/2016 | Strohmenger | G05B 19/0428 | |
| 2016/0377232 A1 * | 12/2016 | Boker | F16L 1/06 | 709/217 |
| 2017/0182605 A1 * | 6/2017 | Rajagopalan | B23K 9/0282 | |
| 2018/0117718 A1 * | 5/2018 | Rajagopalan | B23K 37/0531 | |
| 2018/0259003 A1 * | 9/2018 | Nagai | F16D 3/227 | |
| 2019/0050414 A1 * | 2/2019 | Maturana | G06F 16/164 | |
| 2019/0093828 A1 * | 3/2019 | Bovero | F17D 5/00 | |
| 2019/0138667 A1 * | 5/2019 | Benesh | G06F 30/13 | |
| 2020/0130089 A1 * | 4/2020 | Ivkovich | B23K 9/0956 | |
| 2020/0139471 A1 * | 5/2020 | Pliska | G05B 19/409 | |
| 2020/0147712 A1 * | 5/2020 | Pliska | B23K 31/125 | |
| 2020/0225655 A1 * | 7/2020 | Cella | G05B 23/0264 | |

FOREIGN PATENT DOCUMENTS

| | | | | |
|---|---|---|---|---|
| CN | 108062077 A | * | 5/2018 | |
| CN | 109202339 B | * | 7/2020 | B23K 37/00 |
| KR | 20050028232 A | * | 5/2005 | G06Q 99/00 |

OTHER PUBLICATIONS

Parametric Technology Corporation, "Isometric Drawing Users Guide, CADDIS® 5", revision 6.0, pp. 1-188, Feb. 22, 2001.
Intergraph, "SmartPlant® Spoolgen® for Fabrication and Construction", pp. 1-17, Mar. 30, 2010.

* cited by examiner

FIG. 5

QUALITY CONTROL ISOMETRIC FOR INSPECTION OF FIELD WELDS AND FLANGE BOLT-UP CONNECTIONS

RELATED APPLICATION

The present application claims priority to U.S. Provisional Patent Application No. 62/587,449, filed on Nov. 16, 2017 by Graham Lee et al., titled "Quality Control Isometric for Inspection of Field Welds and Flange Bolt-Up Connections", the contents of which are incorporated herein by reference in their entirety.

BACKGROUND

Technical Field

The present disclosure relates to managing inspection of construction elements, and more specifically to techniques for managing inspection of field welds and flange bolt-up connections.

BACKGROUND INFORMATION

A variety of types of construction elements used in infrastructure construction projects require some form of field inspection. For example, in the field of industrial piping, field welds and flange bolt-up connections may require field inspection. Traditionally, individual construction companies or shops have manually labeled field welds and flange bolt-up connections, generating databases or tables that list all the manually assigned labels. Field inspection workers may then travel to the field, try to locate the field welds and flange bolt-up connections associated with the labels, inspect the items, write down field notes, and then later manually update databases or tables with inspection results. While operable, such techniques are highly labor intensive, requiring significant labor hours for manual labeling and data entry. Further, they are error prone. The large amount of manual data entry is prone to input error, field notes may be easily misplaced, there are data integrity and security challenges, as well as a host of other sources of error and inefficiency.

Accordingly, there is a need for new techniques for managing the inspection of construction elements, such as field welds and flange bolt-up connections.

SUMMARY

A new type of software and process flow that uses a quality control (QC) drawing (e.g., a QC isometric drawing) is provided that can efficiently manage the inspection of construction elements, such as field welds or flange bolt-up connections. The QC drawing includes automatically generated unique numbers associated with locations. The QC drawing may be generated by the software from existing fabrication data (e.g., an issued-for-construction (IFC) fabrication isometric data file) and provided together with a fabrication drawing (e.g., an IFC fabrication isometric drawing) to field inspection workers. Upon inspection, a field inspection worker may mark-up the QC drawing, the marked-up copy being retained in a document management system. Using the QC drawing may save labor hours typically spent in manual labeling and data entry, and help minimize human error.

In one specific embodiment, one or more numbering processes executing on one or more electronic devices automatically generate at least one of: unique numbers for field welds or flange bolt-up connections, in an infrastructure construction project. A modeling process adds the unique numbers for field welds or flange bolt-up connections to a virtual construction model of the infrastructure construction project. Based on the virtual construction model and a fabrication data file (e.g., an IFC fabrication isometric data file) that describes a portion of the infrastructure construction project, a QC drawing generation process generates a QC drawing (e.g., a QC isometric drawing) for the portion of the infrastructure construction project that includes balloons linked to locations of field welds or flange bolt-up connections, each balloon including the unique numbers of a coral responding field weld or flange bolt-up connection. A copy of the QC drawing is provided to a field inspection worker (e.g., as a printed drawing or model file). The QC drawing may be paired with a fabrication drawing (e.g., an IFC fabrication isometric drawing). The field worker performs inspections, and provides back a marked-up copy of the QC drawing that includes field inspection results (e.g., physical signatures/sign-offs or electronic signatures/sign offs) associated with the unique number of each field weld or flange bolt-up connection (e.g., in the balloons including the unique numbers). The marked-up copy may be maintained in a document control system to provide a record of the inspection.

It should be understood that a variety of additional features and alternative embodiments may be implemented other than those discussed in this Summary. This Summary is intended simply as a brief introduction to the reader for the further description that follows, and does not indicate or imply that the examples mentioned herein cover all aspects of the disclosure, or are necessary or essential aspects of the disclosure.

BRIEF DESCRIPTION OF THE DRAWINGS

The application refers to the accompanying drawings of example embodiments, of which.

DETAILED DESCRIPTION

Figure 1:
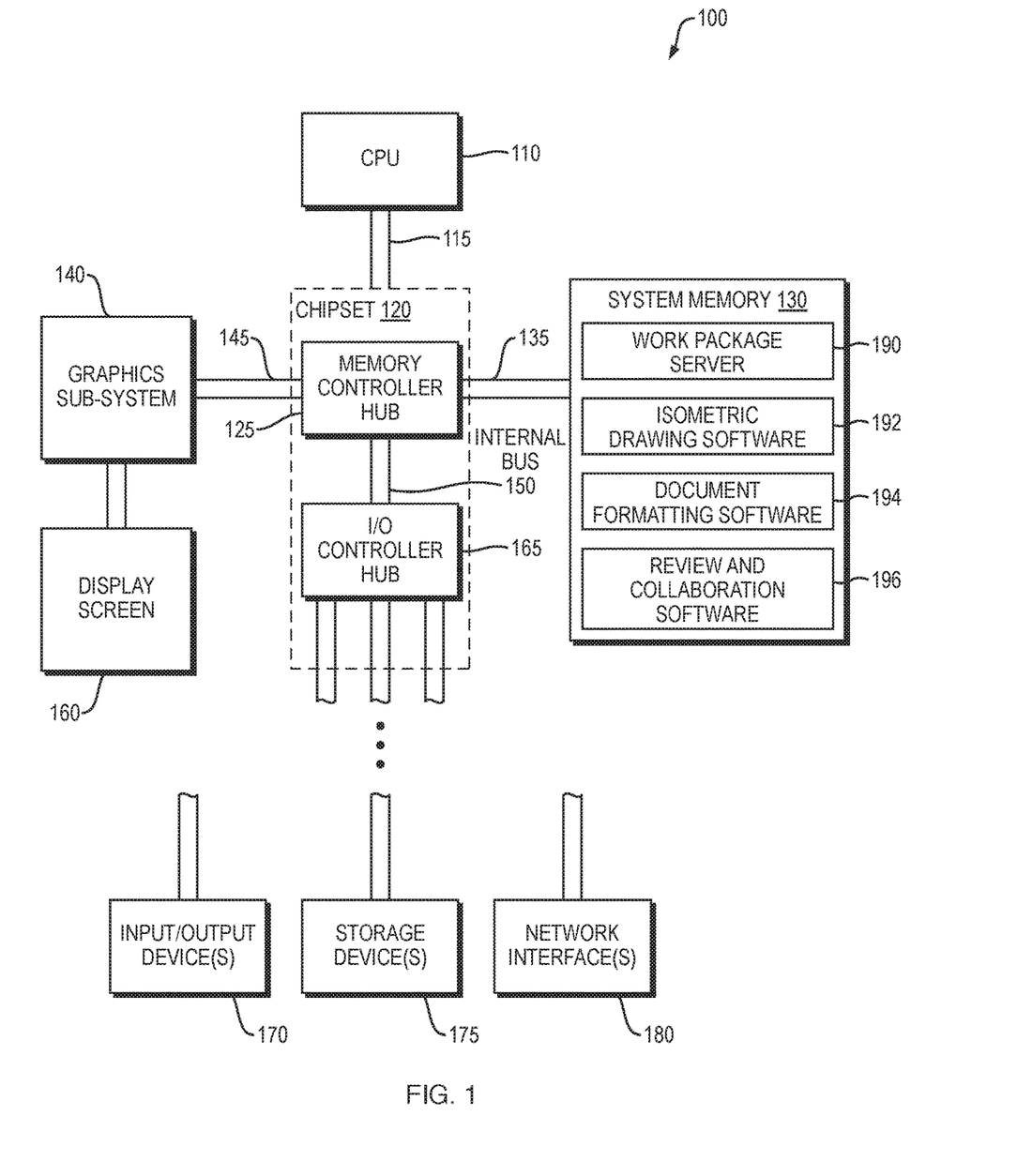
FIG. 1 is a block diagram of an example electronic device, one or more of which may be used to produce QC isometric drawings that may be used to manage inspection of field welds and flange bolt-up connections in an infrastructure construction project (e.g., a pipeline construction project)

FIG. 1 is a block diagram of an example electronic device 100, one or more of which may be used to produce QC isometric drawings that may be used to manage inspection of field welds and flange bolt-up connections in an infrastructure construction project (e.g., a pipeline construction project). The electronic device may represent a server, a desktop computer, a mobile device, or another type of electronic device. The example electronic device includes a central processing unit (CPU) 110 that may be coupled to a chipset 120 by a front side bus 115. The chipset 120 includes a memory controller hub 125 that is responsible for communications with high-speed devices such as system memory 130 and a graphics subsystem (e.g., a graphics card) 140. The memory controller hub 125 is coupled to the system memory 130 by a high-speed memory bus 135. The system memory 130 is typically volatile memory, such as a Random Access Memory (RAM), which is adapted to store a wide range of software actively used by the CPU 110. The memory controller hub 125 is coupled to a graphics subsystem 140 (e.g., a graphics card) by a high-speed graphics bus 145. The graphics subsystem 140 may include a GPU and graphics memory (not shown), among other components. The graphics subsystem 140 is coupled to at least one display screen 160.

The chipset 120 further includes an input/output controller hub 165 coupled to the memory controller hub by an internal bus 150. Among other functions, the input/output controller hub 165 may support a variety of types of peripheral buses for connecting to other system components. The system components may include one or more 110 devices 170, such as a keyboard, a mouse, touch sensor, a printer, etc., one or more persistent storage devices 175, such as a hard disk drive, a solid-state drive, or another type of persistent data store, one or more network interfaces 180, such as an Ethernet interface or a Wi-Fi adaptor, among other system components. The network interface(s) 180 may allow communication with other electronic devices 100 over a computer network, such as the Internet (e.g., to enable various types distributed computing as discussed further below).

Working together, the components of the example electronic device 100 may execute a number of different types of software. The software may include work packaging software 190 that maintains a virtual construction model of an infrastructure construction project and is capable of tracking, updating, and editing work packages related thereto with status updates from the field. The work packaging software 190 may include a number of software processes, such as a unique field weld numbering process, a unique bolts up numbering process and a modeling process; and a number of files that may be associated with virtual construction model, including IFC fabrication isometric drawing files (e.g., portable document format (PDF) files) embodying drawings that show details of how to fabricate portions of the infrastructure construction project and IFC fabrication isometric data files that describes the fabrication of portions of the infrastructure construction project and are used to produce the IFC fabrication isometric drawings. In one example implementation, the work packaging software 190 may be the ConstructSim™ Work Packager Sever available from Bentley Systems. However, it should be understood that the work packaging software 190 may take a number of different forms.

The software may further include isometric drawing software 192 that is capable of managing isometric drawings and generating printable and/or electronically publishable deliverables (e.g., PDF drawings or iModel™ files) using data from a variety of sources, including from the virtual construction model and IFC fabrication isometric drawing files. The isometric drawing software 192 may include a number of software processes, one of which may be a QC isometric drawing generation process that is configured to generate QC isometric drawings that includes balloons linked to locations of field welds or flange bolt-up connections and including unique numbers, as discussed in more detail below. In one example implementation, the isometric drawing software 192 may be the OpenPLANT™ Isometrics Manager available from Bentley Systems. However, it should be understood that the isometric drawing software 192 may take a number of different forms.

The software may further include document formatting software 194 that is capable of editing (e.g., merging) printable drawings (e.g., PDF drawings), for example, merging a QC isometric drawing with the an IFC fabrication isometric drawing to create a printable two-sided or two-page drawing deliverable, as discussed in more detail below. In one example implementation, the isometric document formatting software 194 may be the Adobe Acrobat® software available from Adobe Systems. However, it should be understood that the document formatting software 194 may take a number of different forms.

Still further, the software may include review and collaboration software 196 that is capable of displaying an electronically published version of a QC isometric drawing (e.g., an iModel™ file) to the display screen 160, providing an electronic deliverable. In one example implementation, the review and collaboration software 196 may be Bentley Navigator™ software available from Bentley Systems. However, it should be understood that the review and collaboration software 196 may take a number of different forms.

While the software 190-196 is shown resident together in system memory 130 in FIG. 1 for purposes of illustration, it should be understood that in a distributed implementation the software 190-196 may be executed on separate electronic devices. A wide variety of distribute computing arrangements are expressly contemplated. For example, the work packaging software 190 may be executed on a first electronic device (e.g., a server), the isometric drawing software 192 and document formatting software 194 may be executed on a second electronic device (e.g., a desktop computer) and the review and collaboration software 196 may be executed on a third electronic device (e.g., a mobile device).

Figure 2:
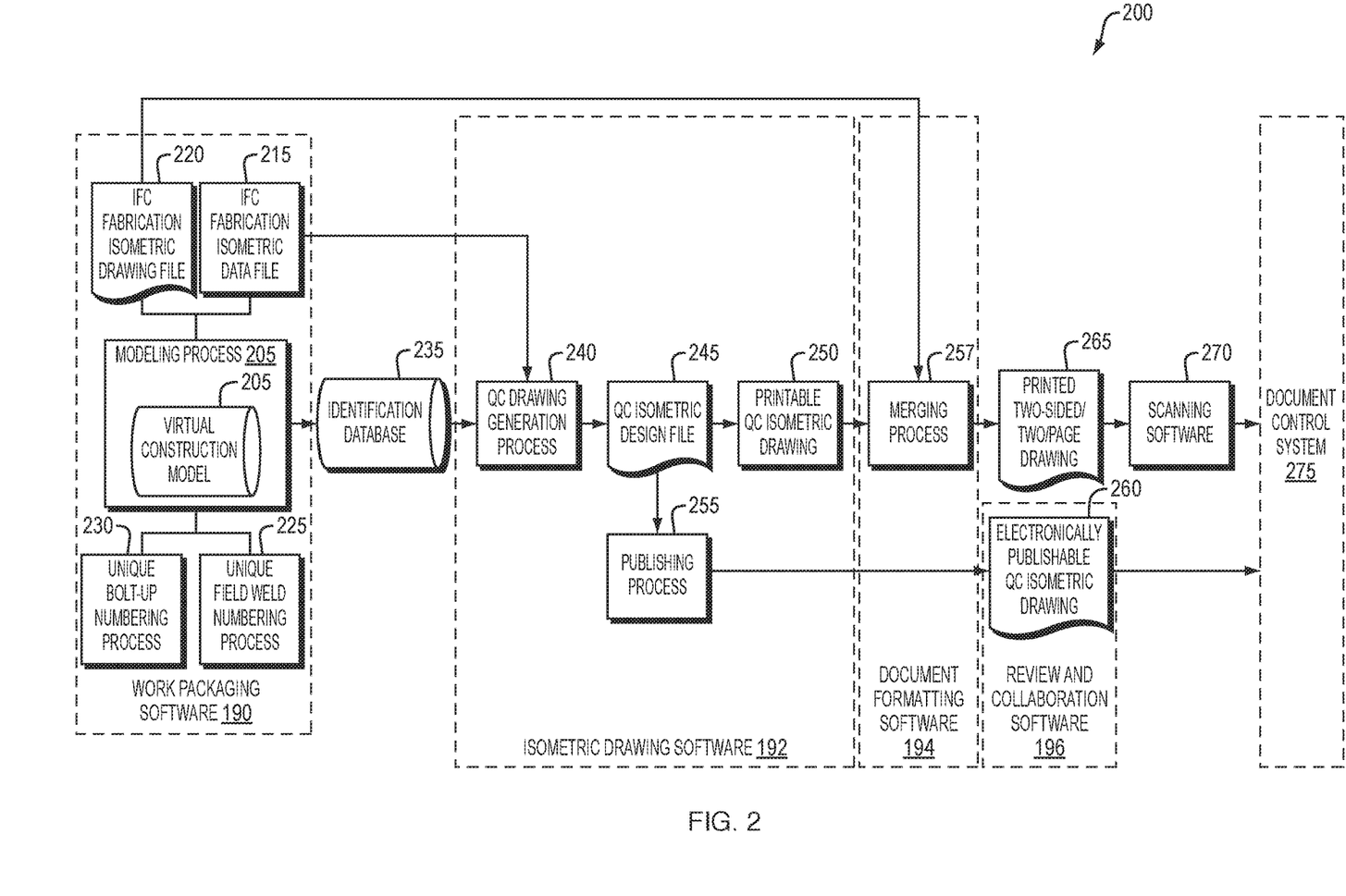
FIG. 2 is a block diagram showing details of interaction of the software to produce QC isometric drawings.
Figure 3:
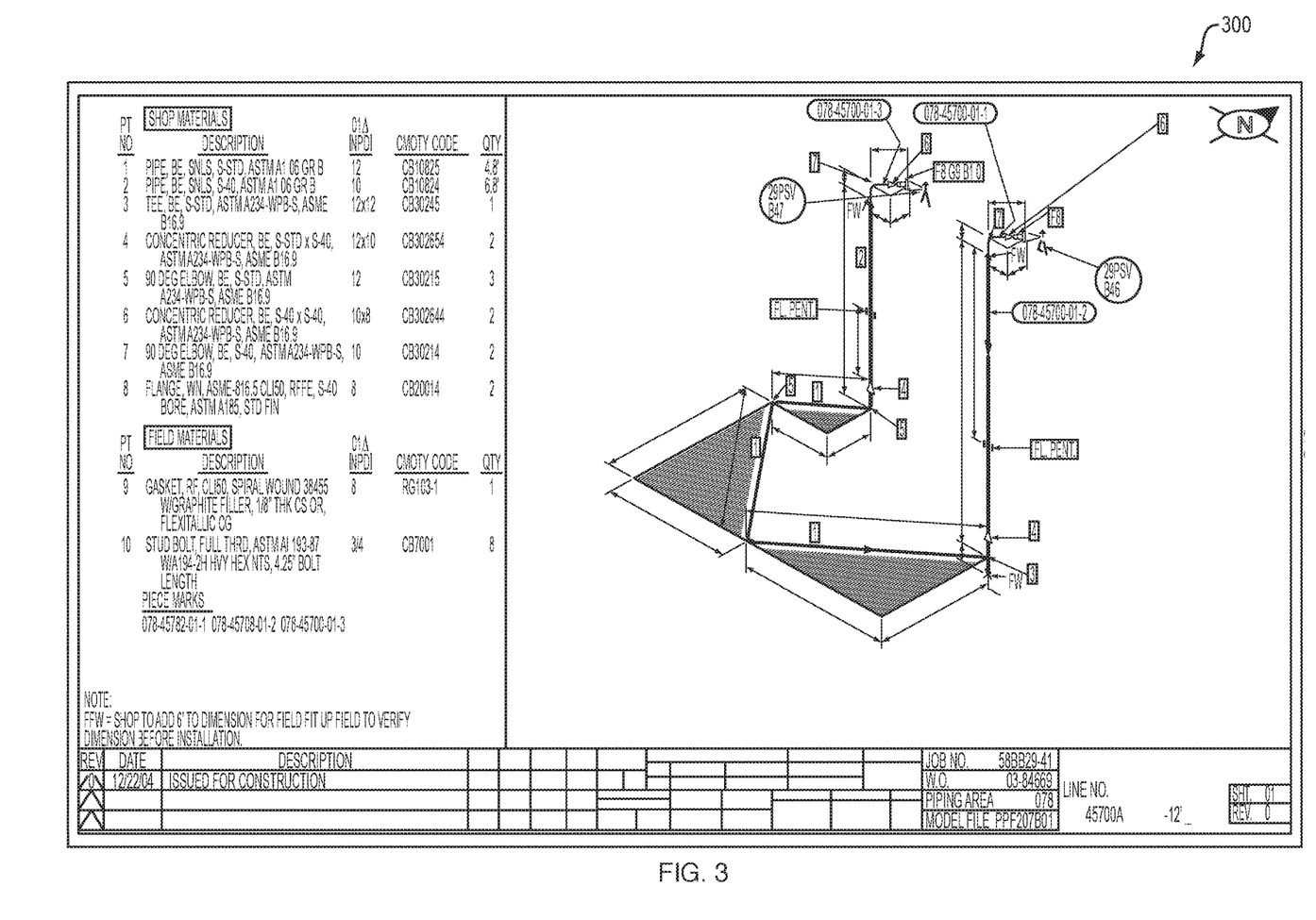
FIG. 3 is an example IFC fabrication isometric drawing that may be represented by an IFC fabrication isometric drawing file.

FIG. 2 is a block diagram 200 showing details of interaction of the software 190-196 to produce QC isometric drawings. The work packaging software 190 includes a modeling process 205 that maintains a virtual construction model 210 of an infrastructure construction project (e.g., a pipeline), which is associated with IFC fabrication isometric data files 215 and IFC fabrication isometric drawing files 220 that describe and show details of how to fabricate portions of the infrastructure construction project. FIG. 3 is an example IFC fabrication isometric drawing 300 that may be represented by an IFC fabrication isometric drawing file 220. The IFC fabrication isometric drawing 300 includes fabrication information, but not construction specific information (such as field weld or bolt-up numbering).

A unique field weld numbering process 225 automatically generates unique numbers for field welds used in the infrastructure construction project. Likewise, a unique bolt-up numbering process 230 automatically generates unique numbers for flange bolt-up connections of the infrastructure construction project. The unique numbers for field welds or flange bolt-up connections are unique identifiers that are maintained throughout the infrastructure construction project's lifecycle. Any of a variety of unique number generation algorithms may be employed by the unique numbering processes 225, 230 to generate the numbers. One example algorithm is a sequential generation algorithm that starts from a predetermined number (e.g., 1, 10.1, etc.) and assigns sequential numbers (e.g., 2, 3, 4 . . . etc., 10.2, 10.3, 10.4, etc.) to each field weld or flange bolt-up connection. The unique numbering processes 225, 230 provide the unique numbering for field welds and flange bolt-up connections to the modeling process 205, which adds them as supplemental data to the virtual construction model 210. Additional information related to the field welds and flange bolt-up connections, such as weld procedures, piping material specifications, torque values, etc., may be obtained from a variety of different sources and also added by the modeling process 205 as supplemental data to the virtual construction model 210.

Figure 4:
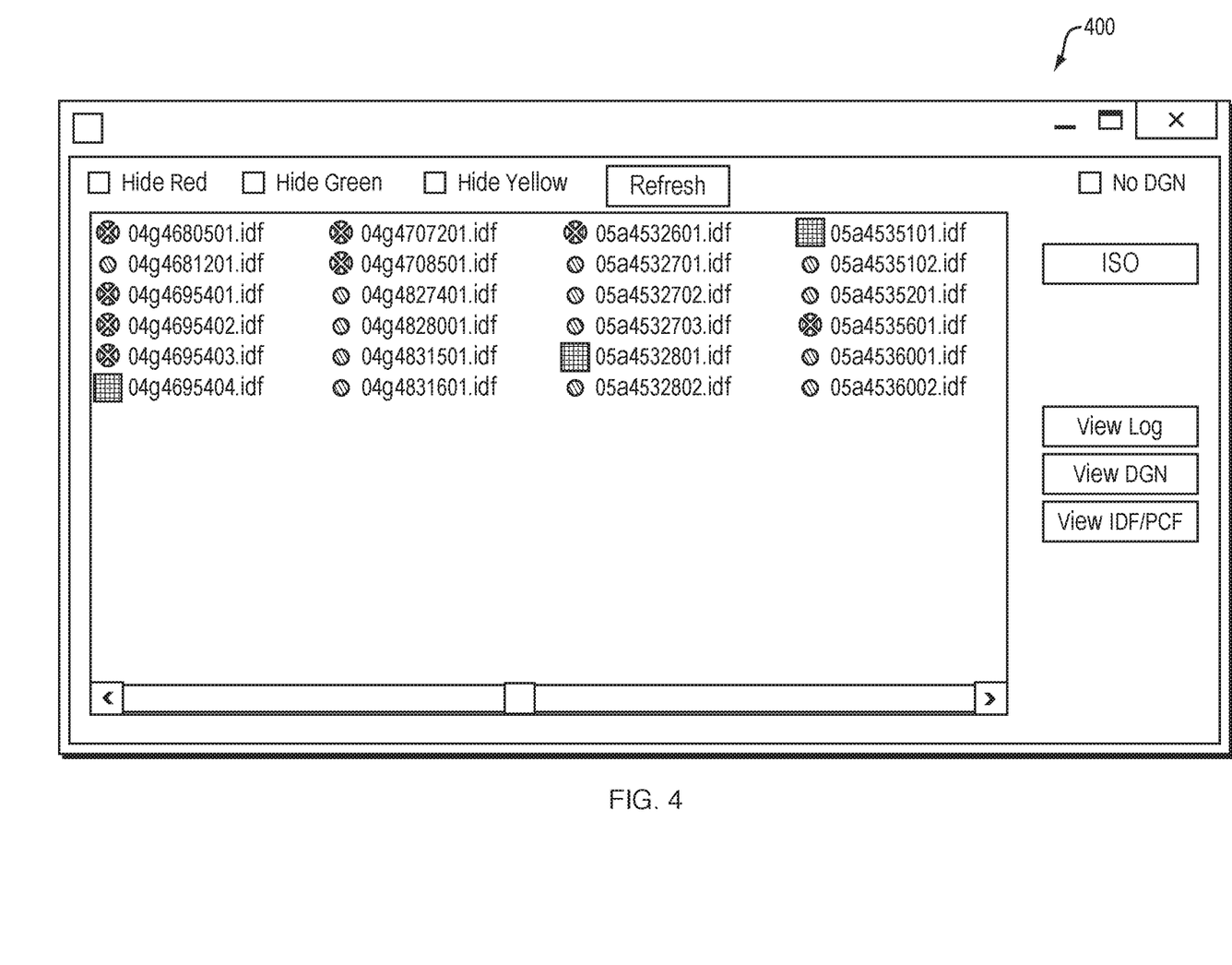
FIG. 4 is an example user interface showing status of the processing of selected IFC fabrication isometric data files by the isometric drawing software.

The work packaging software 190 provides at least the IFC fabrication isometric data files 215 and the supplemental data, in the form of an identification database 235, to the isometric drawing software 192. The isometric drawing software 192 processes selected IFC fabrication isometric data files 215 to produce a printable and/or electronically publishable IFC fabrication isometric drawing. For example, a user interface of the isometric drawing software 192 may allow a user to select desired IFC fabrication isometric data files 215 for particular portions of the infrastructure construction project, and monitor progress of their processing. FIG. 4 is an example user interface 400 showing status of the processing of selected IFC fabrication isometric data files 215 by the isometric drawing software 192. An identifier (e.g., color coding) may be used to signify successful or unsuccessful processing, and/or warnings associated with, of each IFC fabrication isometric data file 215.

As part of the processing of each IFC fabrication isometric data file 215, a QC drawing generation process 240 of the isometric drawing software 192 cross checks field welds and flange bolt-up connections indicated in the IFC fabrication isometric data file 215 with the supplemental information provided from the work packaging software 192 in the identification database 235. Each field weld or flange bolt-up connection is associated with a coordinate in three-dimensional (3D) space, and the coordinate may be used to identify and cross-check specific components. Where corresponding components are identified, the QC drawing generation process 240 adds the supplemental data, including the unique numbering for field welds and flange bolt-up connections, to the IFC fabrication isometric data and formats the result as a QC isometric drawing embodied as a QC isometric design file (e.g., a DGN file) 245. The QC isometric drawing includes construction specific information, namely the unique numbering for field welds and flange bolt-up connections, as well as any additional information (e.g., weld procedures, piping material specifications, torque values, etc.) relevant to the portion of the infrastructure construction project represented. As mentioned above, this data is typically not included in IFC fabrication isometric drawings, so the QC isometric drawing provides different information.

In one embodiment, the QC isometric drawing includes balloons linked to locations of field welds or flange bolt-up connections. As used herein, the term "balloon" refers to a visual element that has a body in which text may appear, and a lead that extends from the body to indicate a linked location. In a specific implementation, the body of each balloon may include text indicating the unique number of the corresponding field weld or flange bolt-up connection. In addition, the body may include an area for receiving a signature or sign-off from a field inspection worker (or multiple workers) that signifies quality control approval. The lead may be a line extending from the body to the location of the field weld or flange bolt-up connection in the drawing. Balloons may have different shapes for different types of information (e.g., circular for field welds, hexagonal for bolt-up connections, etc.). Alternatively, the balloons may otherwise visually differentiate between different types of information, for example, having different colors, textures, transparencies, etc.

Additional information (e.g., weld procedures, piping material specifications, torque values, etc.) may be presented in a report separate from the balloons. The report may use the same unique numbering as the balloons, to relate the additional information to the relevant field weld or flange bolt-up connection The isometric drawing software 192 converts the QC isometric design file (e.g., DGN file) 245 to a printable version (e.g., a QC isometric drawing PDF) 250 and/or to an electronically publishable QC isometric version (e.g., a QC isometric iModel™ file) 260, in the later case using a model publishing process 255.

Figure 5:
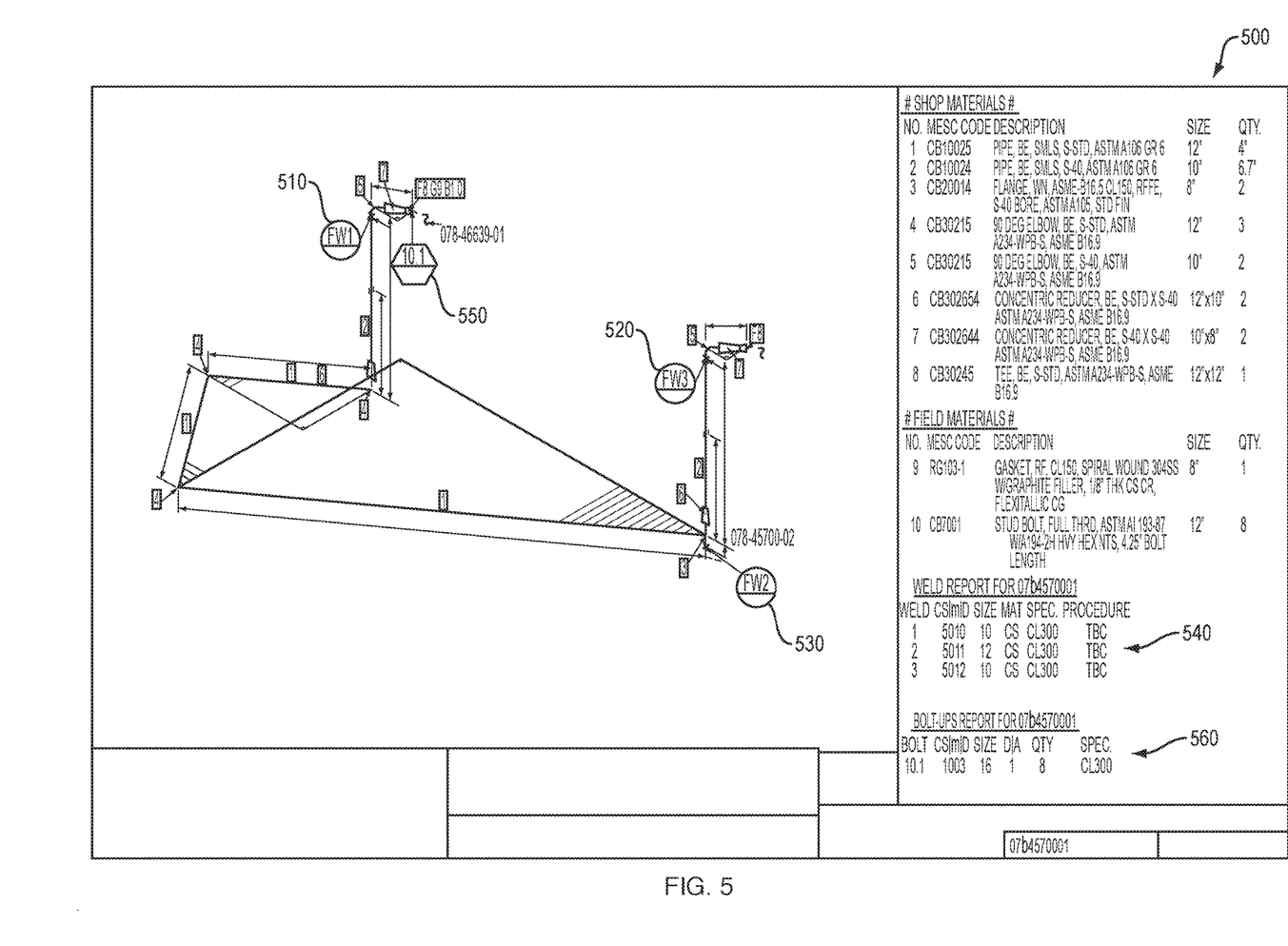
FIG. 5 is an example printable QC isometric drawing that corresponds to the same portion of an infrastructure construction project as the IFC fabrication isometric drawing of FIG. 3.

FIG. 5 is an example printable QC isometric drawing (e.g., a QC isometric drawing PDF) 500 that corresponds to the same portion of an infrastructure construction project as the IFC fabrication isometric drawing 300 of FIG. 3. A first set of balloons 510, 520, 530 are linked to locations of field welds, and have a first visual appearance (e.g., appear as circles), including unique numbering (e.g., 1, 2, 3). Corresponding additional information describing the field welds is presented in a separate report 540, organized using the same unique numbering. Likewise, as second set of balloons 550 are linked to locations of flange bolt-up connections, and have a second visual appearance (e.g., appear as hexagons), including unique numbering (e.g., 10.1). Corresponding additional information 560 describing the flange bolt-up connections is presented as a separate report 560, organized using the same unique numbering.

The printable QC isometric drawing (e.g., the QC isometric drawing PDF) 250 is received by document formatting software 194 that includes a merging process 257 which merges it with the corresponding IFC fabrication isometric drawing to produce a two-sided or two-page drawing. Such drawing is then printed to produce a deliverable 265 that may be used by a field inspection worker. Specifically, the field inspection worker may take the printed deliverable 265 to the field, use the IFC fabrication isometric drawing to orient themselves, inspect the field welds or flange bolt-up connections, and add a physical signature to, or otherwise physically sign-off in, the corresponding balloons in the QC isometric drawing to create a marked-up copy. In the case where multiple approvals are required, multiple field inspection workers may add a signature to, or otherwise sign-off in, the same balloon. The marked-copy of the QC isometric drawing may then be scanned by scanner software 270, and the scanned version maintained in a document control system 275 as a record of inspection.

Alternatively, or additionally, the electronically publishable QC isometric drawing (e.g., QC isometric iModel™ file) 260 is received by review and collaboration software 196 (e.g., executing on a mobile device) which is used by a field inspection worker. The electronically publishable QC isometric drawing is displayed on a display screen 160, and the field inspection worker adds an electronic signature to, or otherwise electronically sign-off in, the corresponding balloons on the display screen 160 using an input device 170. In the case where multiple approvals are required, multiple field inspection workers may add their electronic signature to, or otherwise sign-off in, the same balloon. The marked-copy of the QC isometric drawing may then be uploaded to the document control system 275 as a record of inspection.

In summary, the above description details techniques for managing inspection of field welds and flange bolt-up connections in an infrastructure construction project. It should be understood that various adaptations and modifications may be readily made to what is described above, to suit various implementations and applications. For example, in addition to field welds and flange bolt-up connections, the techniques may be utilized with a variety of other types of construction elements that require inspection, such as structural members, electrical components, storage tanks, etc. Further, while it is discussed above that many aspects of the techniques may be implemented in software (e.g., as executable instructions stored in a non-transitory electronic device readable medium for execution on one or more processors), it should be understood that some or all of the techniques may also be implemented in hardware, for example, in hardware. A hardware implementation may include specially configured logic circuits and/or other types of hardware components. Above all, it should be understood that the above descriptions are meant to be taken only by way of example.

The invention claimed is:

1. A method for managing inspection of field welds and flange bolt-up connections in an infrastructure construction project, comprising:
automatically generating, by one or more numbering processes executing on one or more electronic devices, at least one of unique numbers for field welds or flange bolt-up connections for the infrastructure construction project;
adding each of the unique numbers to a corresponding field weld or flange bolt-up connection associated with a coordinate in three-dimensional (3D) space in a virtual construction model of the infrastructure construction project maintained on the one or more electronic devices;
using the coordinate in 3D space of each field weld of flange bolt-up connection to identify and cross-check the respective field weld or flange bolt-up connection in the virtual construction model and in a fabrication data file that describes a portion of the infrastructure construction project and generating based on the virtual construction model and the fabrication data file a quality control (QC) drawing for the portion of the infrastructure construction project that includes balloons linked to locations of field welds or flange bolt-up connections, each balloon including the unique numbers of a corresponding field weld or flange bolt-up connection;
printing the QC drawing or publishing the QC drawing as a file; and
receiving back a scan or an upload of a marked-up copy of the QC drawing that includes field inspection results associated with the unique number of each field weld or flange bolt-up connection.

2. The method of claim 1, wherein the QC drawing is a QC isometric drawing, and the data file is an issued-for-construction (IFC) fabrication isometric data file.

3. The method of claim 2, further comprising:
merging the QC isometric drawing with an IFC fabrication isometric drawing for the portion of the infrastructure construction project generated from the IFC fabrication isometric data file,
wherein the printing or publishing prints or publishes the merged QC isometric drawing and IFC fabrication isometric drawing.

4. The method of claim 3, wherein the merged QC isometric drawing and IFC fabrication isometric drawing is a two-sided drawing or a two-page drawing.

5. The method of claim 1, wherein the printing the QC drawing or publishing the QC drawing as the file comprises printing the QC drawing, and the receiving back comprises scanning the marked-up copy, wherein the marked-up copy includes physical signatures or sign-offs.

6. The method of claim 1, wherein the printing the QC drawing or publishing the QC drawing as the file comprises publishing the QC drawing as a file to a mobile device, and the receiving back comprises uploading the marked-up copy from the mobile device, wherein the marked-up copy includes electronic signatures or sign-offs.

7. The method of claim 1, further comprising:
maintaining the marked-up copy of the QC isometric drawing in a document control system.

8. The method of claim 1, further comprising:
inspecting, by a field inspection worker, each corresponding field weld or flange bolt-up connection in the portion of the infrastructure construction project; and
adding, by the field inspection worker, a signature or sign-off to each balloon of the QC drawing to signify quality control approval of the corresponding field weld or flange bolt-up connection,
wherein the scan or the upload of the marked-up copy received back includes the signature or sign-off to each balloon.

9. The method of claim 1, wherein the generating the QC drawing is part of processing the fabrication data file.

10. The method of claim 1, wherein the generating the QC drawing further comprises:
producing a design file; and
converting the design file to a printable and/or electronically publishable QC drawing.

11. A system for managing inspection of field welds and flange bolt-up connections in an infrastructure construction project, comprising:
one or more electronic devices including a processor and a memory coupled to the processor configured to store instructions executable on the processor, the instructions including
work packaging software that includes at least
a unique field weld numbering process or a unique bolt-up numbering process configured to automatically generate, respectively, unique numbers for field welds or flange bolt-up connections for the infrastructure construction project, and
a modeling process configured to add each of the unique numbers to a corresponding field welds or flange bolt-up connection associated with a coordinate in three-dimensional (3D) space in a virtual construction model; and
isometric drawing software that includes at least
a quality control (QC) drawing generation process configured to receive information from the virtual construction model and an issued-for-construction (IFC) fabrication isometric data file that describes a portion of the infrastructure construction project, and generate therefrom using the coordinate in 3D space of each field weld of flange bolt-up connection a printable and/or publishable QC isometric drawing for the portion of the infrastructure construction project that includes balloons linked to locations of field welds or flange bolt-up connections, each balloon including the unique numbers of a corresponding field weld or flange bolt-up connection.

12. The system of claim 11, further comprising:
publishing software configured to publish the QC isometric drawing as a file to review and collaboration software on a mobile device.

13. The system of claim 11, further comprising:
document formatting software configured to merge the QC isometric drawing with an IFC fabrication isometric drawing for the portion of the infrastructure construction project generated from the fabrication isometric data file to produce a two-sided drawing or a two-page drawing.

14. The system of claim 13, wherein the document formatting software is configured to print the two-sided drawing or a two-page drawing.

15. A non-transitory electronic-device readable medium having instructions stored thereon, the instructions when executed by one or more processors are operable to:
automatically generate at least one of unique numbers for construction elements in an infrastructure construction project;
add each of the unique numbers to a corresponding construction element associated with a coordinate in three-dimensional (3D) space in a virtual construction model of the infrastructure construction project;
use the coordinate in 3D space of each construction element to identify and cross-check the respective construction element, and generate based on the virtual construction model and a fabrication data file that describes a portion of the infrastructure construction project a quality control (QC) drawing for the portion of the infrastructure construction project that associates the unique numbers of the construction elements to locations;
print the QC drawing or publish the QC drawing as a file; and
receive back a scan or an upload of a marked-up copy of the QC drawing that includes field inspection results associated with the unique number of each construction element.

16. The non-transitory electronic-device readable medium of claim 15, wherein the instructions when executed are further operable to:
publish the QC drawing as a file.

17. The non-transitory electronic-device readable medium of claim 15, wherein the QC drawing is a QC isometric drawing, and the fabrication data file is an issued-for-construction (IFC) fabrication isometric data file.

18. The non-transitory electronic-device readable medium of claim 17, wherein the instructions when executed are further operable to:
merge the QC isometric drawing with an IFC fabrication isometric drawing for the portion of the infrastructure construction project generated from the fabrication isometric data file,
provide the merged QC isometric drawing and IFC fabrication isometric drawing.

19. The non-transitory electronic-device readable medium of claim 15, wherein the instructions when executed are further operable to:
print the QC drawing.

* * * * *

UNITED STATES PATENT AND TRADEMARK OFFICE
CERTIFICATE OF CORRECTION

PATENT NO. : 11,150,622 B2
APPLICATION NO. : 16/193927
DATED : October 19, 2021
INVENTOR(S) : Graham Lee et al.

It is certified that error appears in the above-identified patent and that said Letters Patent is hereby corrected as shown below:

In the Specification

Column 2, Line 14 reads:
"numbers of a coral responding field weld or flange bolt-up"
Should read:
--numbers of a corresponding field weld or flange bolt-up--

Column 3, Line 22 reads:
"system components may include one or more 110 devices"
Should read:
--system components may include one or more I/O devices--

Column 3, Line 42 reads:
"unique bolts up numbering process and a modeling process;"
Should read:
--unique bolt-up numbering process and a modeling process;--

In the Claims

Claim 11:
Column 8, Line 52 reads:
"unique numbers to a corresponding field welds or"
Should read:
--unique numbers to a corresponding field weld or--

Signed and Sealed this
Twentieth Day of February, 2024

Katherine Kelly Vidal
*Director of the United States Patent and Trademark Office*